April 7, 1925.
W. C. STARR
FLEXIBLE TREAD WHEEL
Filed May 19, 1924
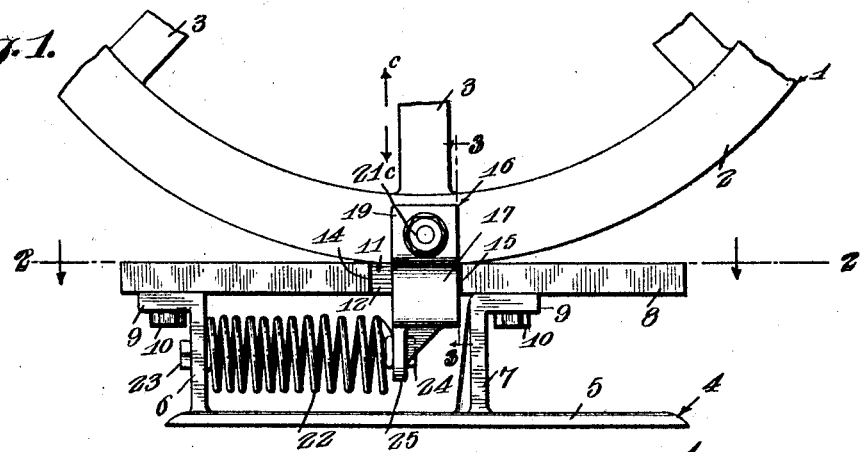

Patented Apr. 7, 1925.

1,532,273

UNITED STATES PATENT OFFICE.

WYATT C. STARR, OF LAKE WALES, FLORIDA.

FLEXIBLE-TREAD WHEEL.

Application filed May 19, 1924. Serial No. 714,444.

*To all whom it may concern:*

Be it known that I, WYATT C. STARR, a citizen of the United States, residing at Lake Wales, in the county of Polk and State of Florida, have invented a new and useful Flexible-Tread Wheel, of which the following is a specification.

The device forming the subject matter of this application is an attachment for a vehicle wheel, in the nature of a tread, adapted to prevent the wheel from sinking into the ground, and the invention aims to provide novel means whereby the tread may be connected to the wheel in such a way as to permit the tread to have the necessary movements with respect to the wheel, the construction being simple and being well adapted to withstand hard use.

It is within the province of the disclosure to improve generally and to enhance the utility of devices of that sort to which the invention appertains.

With the above and other objects in view, the invention consists in the novel construction and arrangement of parts hereinafter described and shown in the drawings, it being understood that, within the scope of what is claimed, changes can be made without departing from the spirit of the invention.

In the drawings: Figure 1 shows in side elevation, a device constructed in accordance with the invention and assembled with a wheel; Figure 2 is a section taken on the line 2—2 of Figure 1; Figure 3 is a section taken on the line 3—3 of Figure 1.

The numeral 1 marks a wheel including a rim 2 and spokes 3.

In carrying out the invention, there is provided a tread 4, including a base 5 having standards 6 and 7, spaced apart longitudinally of the base. The tread 4 comprises a body 8 of considerably less width than the base 5, the standards 6 and 7 having oppositely extended flanges 9 connected by securing elements 10 with the body 8. Intermediate its ends, the body 8 is cut away as at 11 to form a reduced neck 12 and shoulders 14 and 15.

A connector 16 is supplied, the connector being of U-shape, generally speaking. The connector comprises a loop-shaped head 17, the side portions of which are inwardly extended as at 18, to form arms 19 seated in recesses 20 in the sides of the rim 2 and held on the rim by a securing device 21, such as a bolt passing through the rim 2. The connector 16 surrounds the neck 12 of the body 8 of the tread 4 loosely, so that the tread can have movement in a direction parallel to the base 4, in the direction of the line of travel, as indicated by the arrows A in Figure 2. The tread can also have a movement with respect to the wheel rim 2, in a direction parallel to the base 5, but transversely of the line of travel, as indicated by the arrows B in Figure 2. Further, the tread 4 can have a movement with respect to the wheel rim in a direction at right angles to the base 5, as indicated by the arrows C in Figure 1. The result is that the tread 4 will always conform freely and readily to the surface of the ground, when the wheel rim 2 is in contact with the body 8, regardless of whether the vehicle is travelling forwardly or backwardly in a straight line, or turning either to the right or to the left. The movement between the tread 4 and rim 2 is limited resiliently by a coiled spring 22, one end of which is secured at 23 to the standard 6, the other end of the spring being secured at 24 to a lug 25 projecting from the outer end of the head 17 of the connector 16, the spring being housed between the standards 6 and 7. When the spring 22 is in a neutral condition, the head 17 of the connector 16 is spaced from the shoulders 14 and 15. When the spring is elongated, the head 17 will engage the shoulders 15, as shown in Figures 1 and 2: and when the spring is under sufficient compression, the head 17 of the connector 16 will engage the shoulders 14.

Generally stated, the device embodies an exceedingly simple and strong means whereby a tread may be connected to a wheel rim, yieldably, for practically universal movement.

What is claimed is:—

1. In a device of the class described, a tread comprising a base, a body, and standards connecting the base and the body; a connector surrounding the body loosely, a spring united with the connector and with one standard; and means for assembling the connector with a wheel.

2. In a device of the class described, a tread comprising a base, a body, and means for connecting the base and the body, the body having a reduced neck; a connector loosely surrounding the neck; a spring united with the connector and with the tread; and means for assembling the connector with a wheel.

3. In a device of the class described, a tread comprising a base, a body, and standards connecting the base and the body, the body having a reduced neck defining shoulders; a connector loosely surrounding the neck; a spring located between the standards and assembled with the connector and with one standard, the connector being spaced from the shoulders and being located intermediate the ends of the neck when the spring is in a neutral condition; and means for mounting the connector on a wheel.

In testimony that I claim the foregoing as my own, I have hereto affixed my signature in the presence of two witnesses.

WYATT C. STARR.

Witnesses:
 H. M. WIGGINS,
 E. H. BORE, Jr.